United States Patent
Mainetti et al.

(10) Patent No.: US 10,474,392 B2
(45) Date of Patent: Nov. 12, 2019

(54) DYNAMIC SCHEDULING FOR VIRTUAL STORAGE DEVICES

(71) Applicant: Microsoft Technology Licensing, LLC, Redmond, WA (US)

(72) Inventors: Attilio Mainetti, Redmond, WA (US); Murtaza Ghiya, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 81 days.

(21) Appl. No.: 15/708,819

(22) Filed: Sep. 19, 2017

(65) Prior Publication Data

US 2019/0087124 A1 Mar. 21, 2019

(51) Int. Cl.
- *G06F 9/455* (2018.01)
- *G06F 3/06* (2006.01)
- *G06F 9/50* (2006.01)
- *G06F 9/48* (2006.01)

(52) U.S. Cl.
CPC ........ *G06F 3/0659* (2013.01); *G06F 9/45558* (2013.01); *G06F 9/4881* (2013.01); *G06F 9/5044* (2013.01); *G06F 9/5077* (2013.01); *G06F 3/061* (2013.01); *G06F 9/5083* (2013.01); *G06F 2009/45579* (2013.01)

(58) Field of Classification Search
CPC .... G06F 3/061; G06F 3/0659; G06F 9/45554; G06F 9/45558; G06F 9/4881; G06F 9/5044; G06F 9/5077; G06F 9/5083; G06F 2009/45579
USPC ............................................ 718/1, 101–104
See application file for complete search history.

(56) References Cited

U.S. PATENT DOCUMENTS

| | | | |
|---|---|---|---|
| 7,296,267 B2 | 11/2007 | Cota-Robles et al. | |
| 7,711,789 B1 * | 5/2010 | Jnagal | G06F 3/0605 709/213 |
| 8,180,975 B2 | 5/2012 | Moscibroda et al. | |
| 9,027,011 B1 | 5/2015 | Lam et al. | |
| 9,081,621 B2 | 7/2015 | Fahrig | |
| 9,384,036 B1 | 7/2016 | Barroso et al. | |
| 9,397,944 B1 * | 7/2016 | Hobbs | H04L 47/00 |

(Continued)

OTHER PUBLICATIONS

Rosenblum et al., "I/O Virtualization", 2011, ACMQueue, 10 pages (Year: 2011).*

(Continued)

*Primary Examiner* — Ted T. Vo

(57) ABSTRACT

Embodiments described herein relate to adjusting performance of a virtualization layer to reduce underutilization of a physical device. The virtualization layer virtualizes access to the device for a VM. When a guest in the VM makes a request to a virtual device, the virtualization layer and the device work together to satisfy the request. Some time is spent by the virtualization layer (software/CPU time), for instance delivering the request from the VM to the physical device, mapping the request from the virtual device to the physical device, etc. Additional time is spent by the device in performing the request (device time). The software/CPU time relative to the device time serves as a basis for deciding whether to increase or decrease processing capacity of the virtualization layer (or a component thereof), thus reducing underutilization of the device and over-provisioning of processing capacity to the virtualization layer.

19 Claims, 8 Drawing Sheets

(56) References Cited

U.S. PATENT DOCUMENTS

| | | |
|---|---|---|
| 2006/0064697 A1 | 3/2006 | Kagi et al. |
| 2006/0112251 A1* | 5/2006 | Karr ..................... G06F 3/061 |
| | | 711/170 |
| 2014/0115228 A1* | 4/2014 | Zhou ................. G06F 9/45533 |
| | | 711/102 |
| 2015/0142750 A1* | 5/2015 | Mutalik ............. G06F 11/1451 |
| | | 707/654 |
| 2017/0249186 A1* | 8/2017 | Zheng .................... H04L 47/56 |

OTHER PUBLICATIONS

Omar-Qais Noorshams, "Modeling and Prediction of I/O Performance in Virtualized Environments", 2015, Karlsruhe Institute of Technology, Karlsruhe, Germany, retrieved from https://publikationen.bibliothek.kit.edu/1000046750, 225 pages (Year: 2015).*

Fayyad-Kazan et al., "RTS Hypervisor Qualification for Real-time Systems", Aug. 2016, International Journal on Recent and Innovation Trends in Computing and Communication, vol. 4, Issue: 8, pp. 147-155 (Year: 2016).*

Choi, et al., "SAN Optimization for High Performance Storage with RDMA Data Transfer", In Proceedings of the SC Companion: High Performance Computing, Networking Storage and Analysis, Nov. 10, 2012, 6 pages.

* cited by examiner

DYNAMIC SCHEDULING FOR VIRTUAL STORAGE DEVICES

BACKGROUND

Machine or system virtualization has become common due to many known advantages. Machine virtualization involves abstracting the hardware resources of a computer and presenting the computer as virtual machines. A layer of software referred to as a hypervisor or virtual machine monitor (VMM) runs directly on the hardware of a computer. The hypervisor manages access to the hardware of the computer by virtual machines (VMs), which are also known as partitions, domains, or guests. Each VM is a software environment or construct capable of hosting its own guest operating system. The hypervisor manages the VM's sharing of the computer's processing hardware, memory, and other hardware. The presence of a layer of software—the hypervisor—between the guest operating system and the computer hardware is mostly transparent to the guest operating system.

Guest software in a VM interacts with the host's hardware through a hypervisor or virtualization layer. The guest issues requests to virtual hardware, the requests typically flow through a high-speed software channel between the VM and the virtualization layer, which matches the requests with the real hardware that backs the VM's virtual hardware. A virtualization layer typically receives a VM's requests through a channel, queues the requests, and directs the requests to the appropriate hardware. The guest may not be aware of the virtualization layer, but the virtualization layer introduces overhead in its handling of the guest's requests. For example, dequeuing requests, mapping requests to backing hardware, passing the requests to the backing hardware, and providing results to the VM are typical overhead operations that the virtualization layer incurs.

Virtualization software is often designed with assumptions about the performance of hardware. It has been assumed that the performance of some types of hardware will be slow relative to the overhead of supporting operations of the virtualization layer. For instance, it has been assumed that the latency of servicing VM requests will be mostly attributable to hardware and that the virtualization layer software will impose a relatively small part of the overall latency for handling the VM requests. However, some hardware devices, and even the hardware for communicating with the devices, are becoming fast enough to question this assumption. Some storage devices may now operate on the order of microseconds rather than milliseconds. As storage devices, network interface cards, and other types of virtualized hardware become faster, the relative latency that virtualization adds becomes more significant. In some cases, hardware may be increasingly idle while it waits for the virtualization layer to feed it requests from VMs. That is, the virtualization layer may become a bottleneck and hardware may be underutilized, which defeats one of the benefits of virtualization.

Although it is possible to increase the processing capacity available to the virtualization layer and theoretically reduce its latency, the conditions under which the virtualization layer may become a bottleneck between a guest and hardware are difficult to know in advance. Hardware and workload may vary, even for one VM over short periods of time. There is a need for virtualization layers to dynamically adjust the processing capacity that is available for handling VM requests in ways that are flexible, automatic, independent of workload, and reduce the chance of hardware underutilization without incurring excessive overhead by the virtualization layer.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to adjusting performance of a virtualization layer to reduce underutilization of a physical device. The virtualization layer virtualizes access to the device for a VM. When a guest in the VM makes a request to a virtual device, the virtualization layer and the device work together to satisfy the request. Some time is spent by the virtualization layer (software/CPU time), for instance delivering the request from the VM to the physical device, mapping the request from the virtual device to the physical device, etc. Additional time is spent by the device in performing the request (device time). The software/CPU time relative to the device time serves as a basis for deciding whether to increase or decrease processing capacity of the virtualization layer (or a component thereof), thus reducing underutilization of the device and over-provisioning of processing capacity to the virtualization layer.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
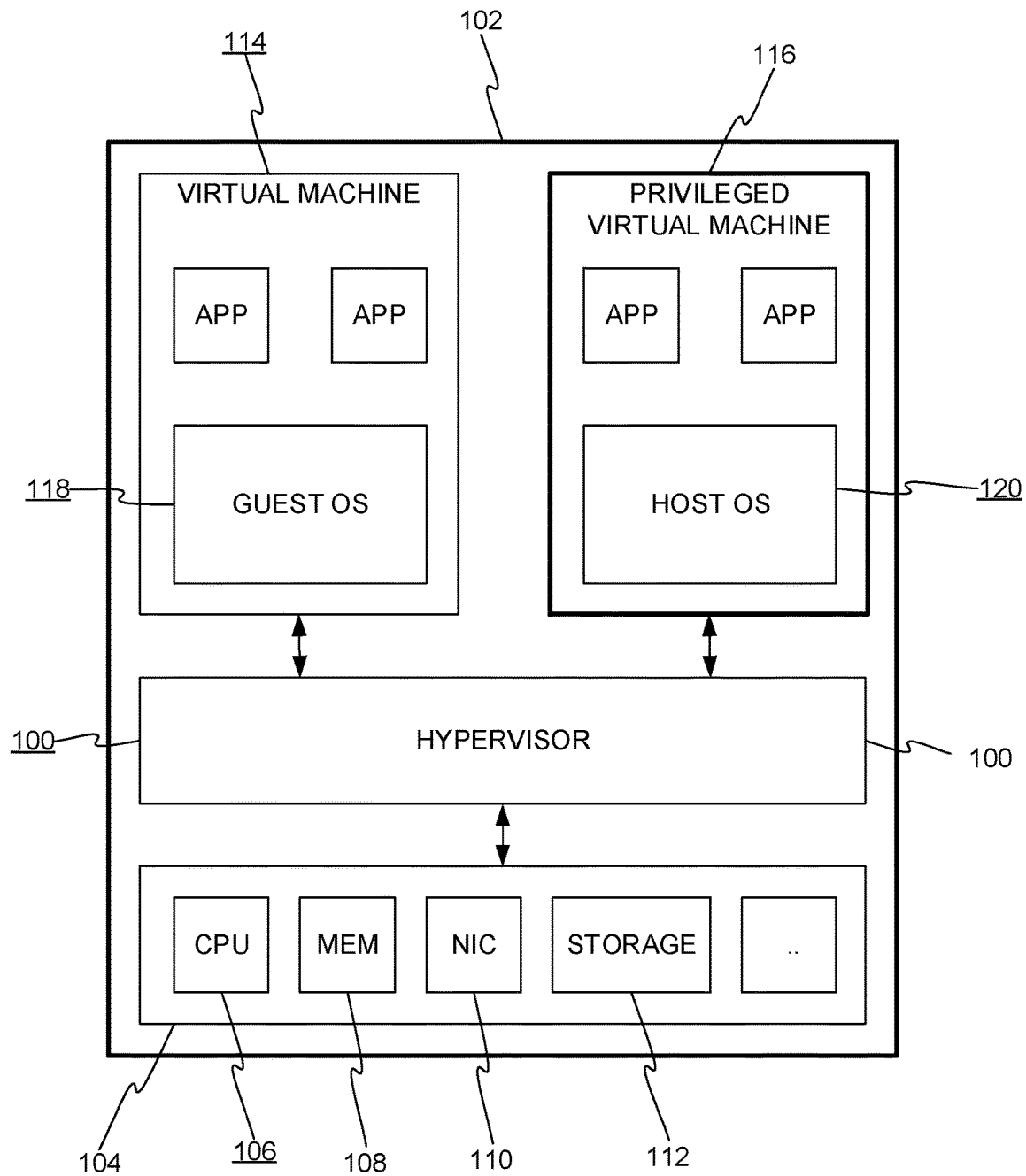
FIG. 1 shows an example virtualization environment that includes a known type of hypervisor.

FIG. 1 shows an example virtualization environment that includes a known type of hypervisor 100. A computer 102 has hardware 104, including a central processing unit (CPU) 106, memory 108, a network interface card (NIC) 110, non-volatile storage 112, and other components not shown, such as a bus, a display and/or display adapter, etc. The hypervisor 100 manages and facilitates execution of virtual machines (VMs) 114, 116. Each virtual machine 114, 116 typically has virtualized devices including a virtual disk within which a guest/host operating system 118, 120 is stored. Machine or system virtualization is provided by the hypervisor 100 cooperating with a host operating system 120 that executes in a privileged VM 116.

The tasks of virtualization may be distributed between the hypervisor 100 and the host operating system 120 in known ways. In some cases, the host operating system 120 might consist of only minimal virtualization elements such as tools and user interfaces for managing the hypervisor 100. In other cases, the host operating system 120 might include one or more of: device virtualization management, inter-VM communication facilities, running device drivers, starting, or stopping other VMs. In some embodiments, virtualization may mostly take place within the hypervisor kernel (or a virtualization module that plugs into a stock kernel) and there is no privileged VM 116. These variations of machine virtualization architectures will be referred to collectively as a virtualization layer. The term "virtual machine" as used herein also refers to partitions, domains, and other terms for the units of virtualization that are designed to host guest operating systems.

Figure 2:
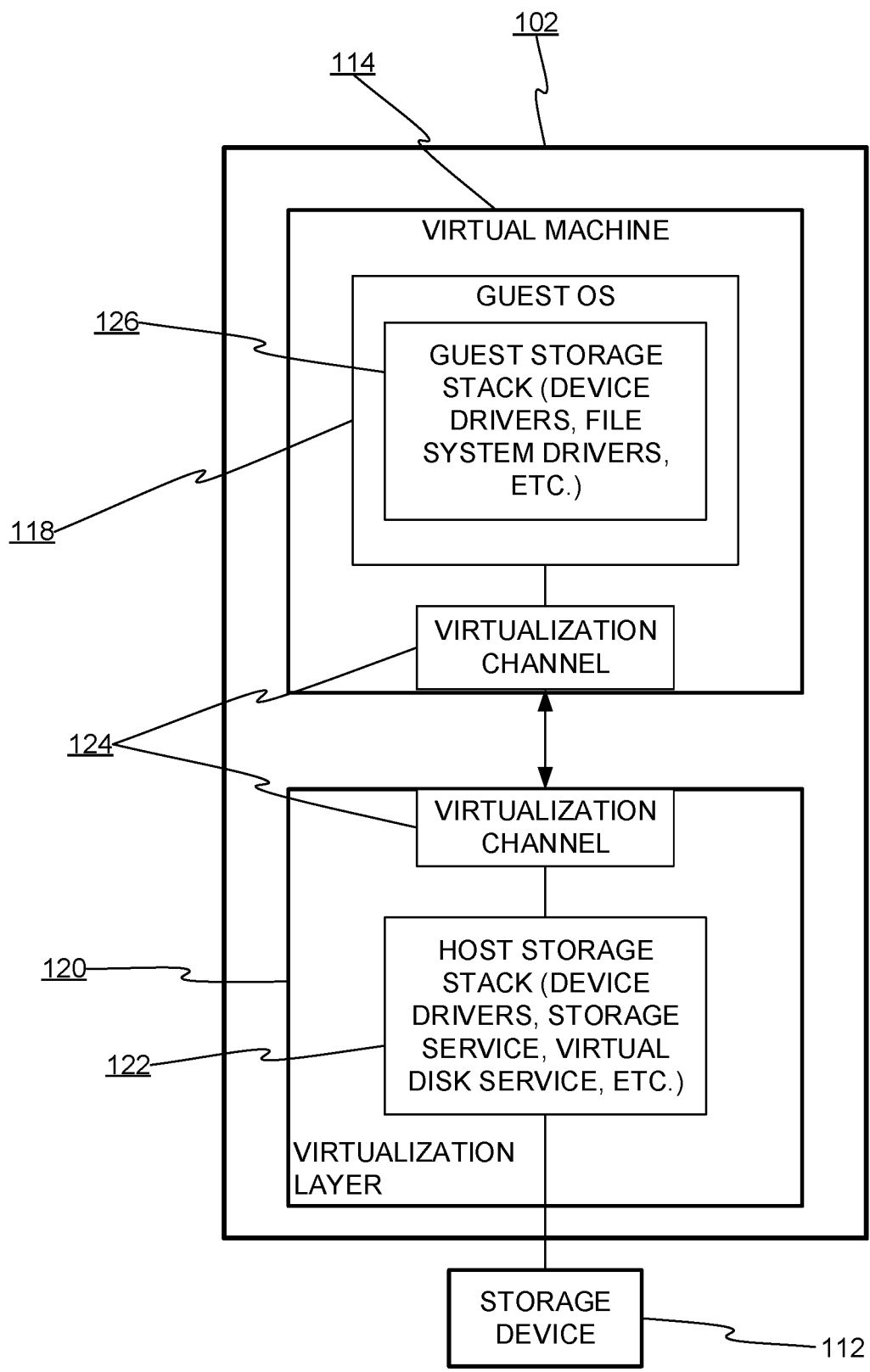
FIG. 2 shows a virtualization layer and storage related features.

FIG. 2 shows a virtualization layer 120 and storage related features. Because storage hardware and virtualization may be particularly susceptible to performance and latency imbalances, storage devices and virtualization operations will be discussed herein as an example for application of the techniques described herein. The techniques may be used for other types of hardware such as NICs, graphics hardware, and others.

The virtualization layer 120 includes a storage stack 122 of software elements that may help deliver input/output (I/O) requests from the guest 118 of the VM 114. The storage stack 122 may include elements such as device drivers, a storage service, a virtual disk service, and others. The virtualization layer 120 also includes a communication service for allowing VMs to communicate with the virtualization layer and possibly with other VMs. The communication service of the virtualization layer 120 commissions or assigns virtualization channels 124 as needed. A virtualization channel ("channel" hereafter) is a software construct that enables a VM/guest and the virtualization layer to directly communicate. Examples include Xen's Xenbus, VMWare's VMCI (Virtual Machine Communication Interface), Microsoft's VM Bus, to name a few.

The channel 124 has an endpoint in the virtualization layer 120 and the VM 114. The guest 118 of the VM 114 includes a guest storage stack 126. The guest storage stack 126 may entail any known operating system components for managing storage, for instance file system drivers, device drivers, volume management services, and so forth. In one embodiment, a device driver may be configured to communicate with a virtual storage device by interfacing with the channel 124.

Figure 3:
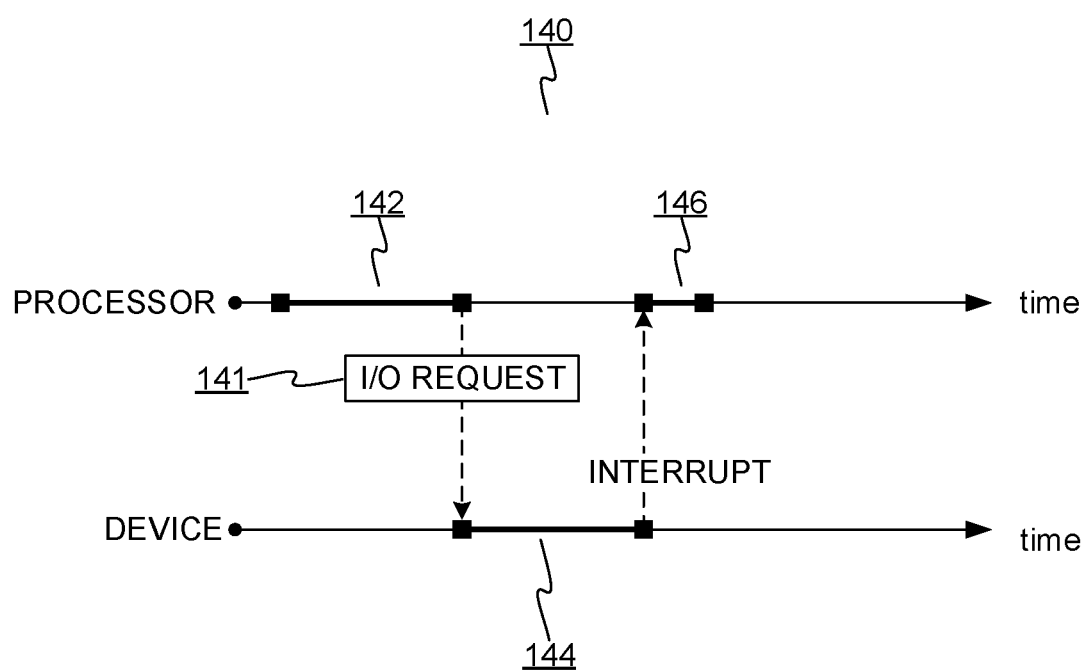
FIG. 3 shows a timeline of how an I/O request originating at the guest may progress through completion at the virtualization layer.

FIG. 3 shows a timeline 140 of how an I/O request 141 originating at the guest 118 may progress through completion at the virtualization layer. A first time period 142 corresponds to the I/O request 141 arriving at the virtualization layer over the channel 124. The I/O request may resemble any type of I/O request issued by an operating system to hardware (albeit virtualized in this case). During the first time period 142 code of the virtualization layer executes on a processor (or core) to deliver the I/O request to the storage device 112. A second time period 144 corresponds to the storage device receiving and carrying out the I/O request, for instance, storing data in the I/O request, retrieving data specified by the request, obtaining metadata, and so forth. When the storage device is finished the second time period 144 ends. An interrupt may be generated to signal the virtualization layer that the I/O request is complete. The virtualization layer receives a completion message from the storage device and during a third time period 146 the virtualization layer performs steps necessary to pass the completion message through the channel 124 to the guest.

As can be seen from FIG. 3, the time for handling the guest's I/O request, i.e., the host-side latency, is a sum of hardware processing time and CPU time. While the virtualization layer may not be able to significantly affect the second time period 144 (storage device time), the virtualization layer, as the privileged layer that interfaces with hardware, may be modified to adjust its processing capacity for handling the I/O requests to affect the first and third time periods. That is to say, the virtualization layer may be able to dynamically adjust the processing capacity available for it to intermediate between the guest and the storage device.

Figure 4:
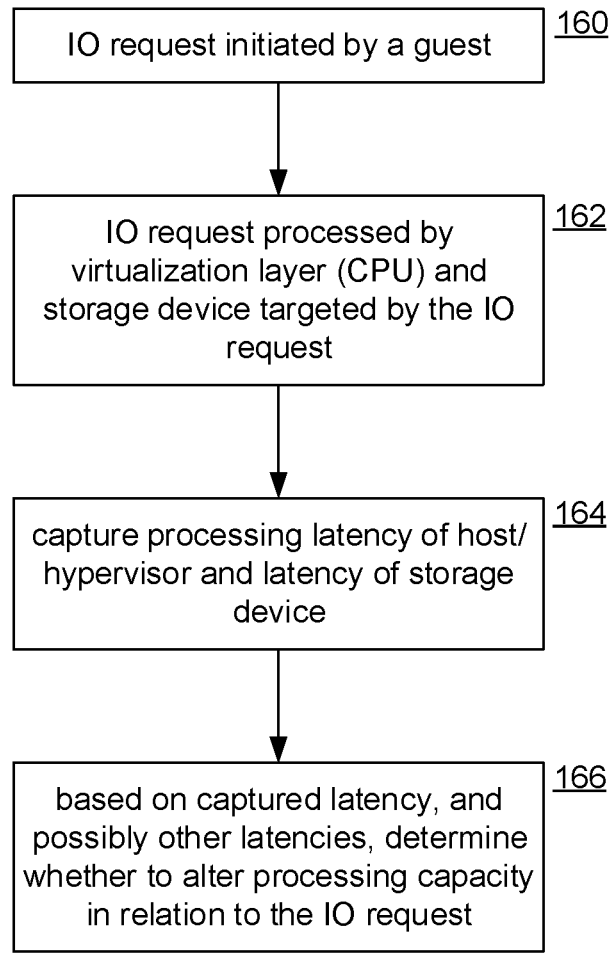
FIG. 4 shows a process for adjusting processing capacity for handling I/O requests based on measures of relative times that the virtualization layer and the storage hardware spend servicing an I/O request.

FIG. 4 shows a process for adjusting processing capacity for handling I/O requests based on measures of relative times that the virtualization layer and the storage hardware spend servicing an I/O request. Initially, at step 160, an I/O request is generated by guest software. When the guest sends the request to what appears to be hardware (virtual hardware corresponding to the storage device), the request passes through the channel 124 to the virtualization layer.

At step 162 the virtualization layer and storage hardware processing the request. The virtualization layer, for instance, places the request in a queue, parses it, dequeues it, or other steps involved with delivering the request to the storage hardware. The storage hardware performs the request. Statistics about the latency of the host processing time and the storage device time are captured and collected at step 164. Any statistics that directly or indirectly relate to the time periods discussed above may be used. For instance, kernels that maintain performance statistics can be readily tapped to obtain times that a thread or process spends processing, times between events or operations, and so forth. Processing times of the hardware device may be obtained from a driver for the device, from the kernel, deduced from other event times (e.g., time completed minus time started). In general, any data that can be used to infer performance of the virtualization layer relative to performance of the storage device will suffice. The relative performances of these two components are helpful for allocating processing capacity to the virtualization layer elements that intermediate between the channel to the VM and the storage device.

At step 166 the performance data from step 164 is used as a basis for adjusting the performance of the virtualization layer relative to the storage device. As described in detail below, a goal is to dynamically and optimally minimize latency. The amount of adjustment for performance balancing will depend on the collected performance data perhaps in view of previous calibration analysis, as described further below. The objective will be to identify conditions when underutilization of the storage device occurs or when the storage device is not underutilized but the virtualization components are over-provisioned and perhaps wasting resources or actually increasing software latency. The storage device and/or the virtualization software may be adjusted accordingly.

Most storage devices have little need or ability to vary their performance capacity, and therefore adjusting the relative software-hardware performance will focus on adjusting the software (virtualization layer) performance. Nonetheless, techniques described herein for balancing performance can be readily supplemented with hardware adjustments, if available. For example, if the storage device is a RAM (random access memory) drive, various power and clock settings may be dynamically adjusted to change the device's performance.

Regarding adjusting the processing capacity allocated to the relevant intermediating components of the virtualization layer, such components will consist of one or more execution units (e.g., threads, processes, cores). How those execution units are adjusted to vary processing capacity will depend on what kind of execution units are in use. If a pool of threads is servicing the channel, then the number of threads may be increased or decreased. If a single process or thread is in use, given appropriate CPU support, the speed of the thread/process may be increased or decreased at the CPU. Similarly, a core on which the components are running may be adjusted for speed.

Figure 5:
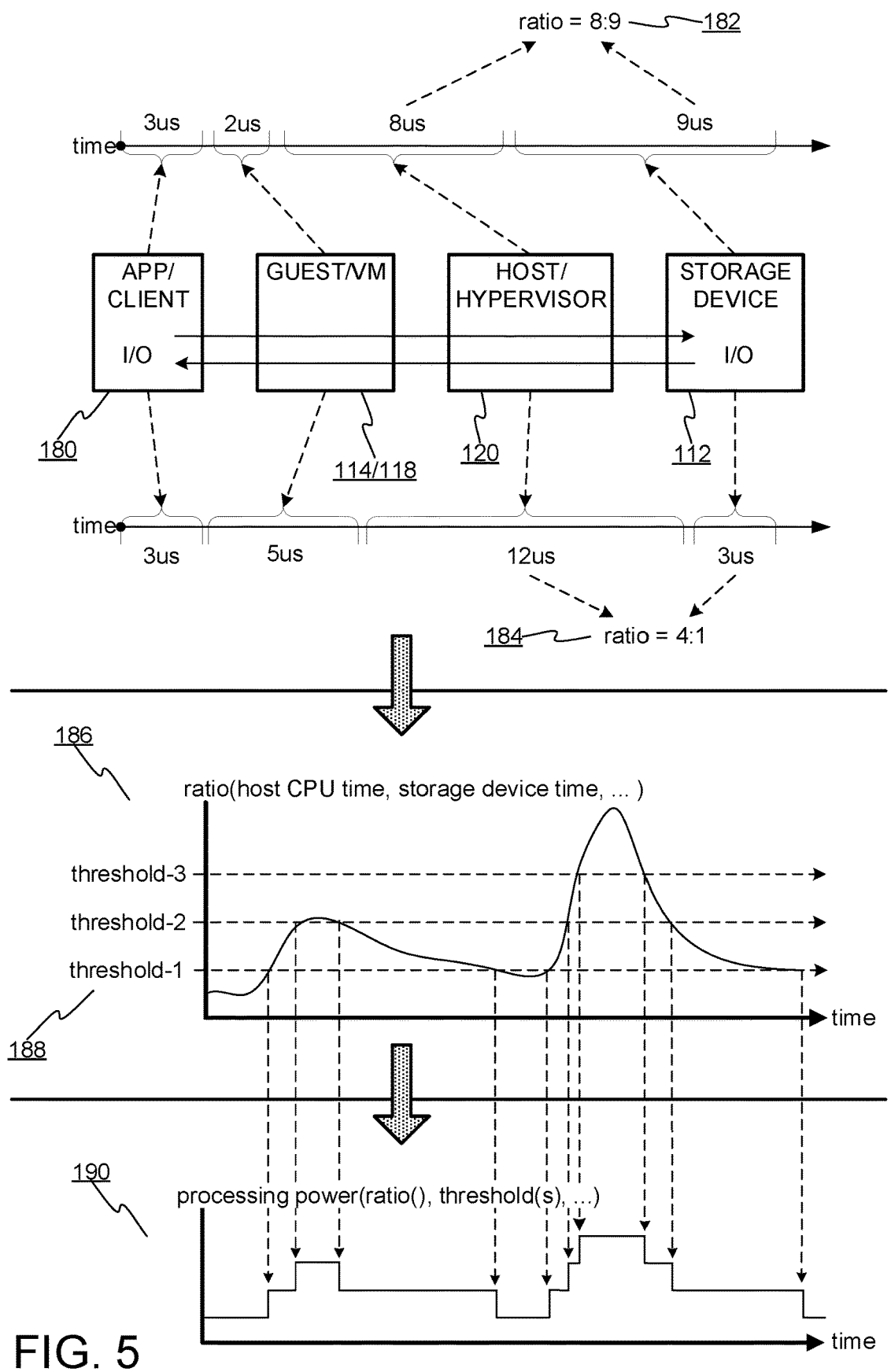
FIG. 5 shows an embodiment based on ratios of measured latency and thresholds for same.

FIG. 5 shows an embodiment based on ratios of measured latency and thresholds for same. The upper section of FIG. 5 shows I/O flow between an application 180 and the storage device 112. A first I/O request (shown at top) originates at the application 180. The guest then passes the first request through the channel 124 to the host (virtualization layer) and on to the storage device 120. A return value may be passed back the same way. Although the time spent by the application and guest may contribute to overall latency, these factors may be difficult to factor. However, the time spent by the host (8 microseconds) and the device (9 microseconds) are readily obtainable and can be leveraged to estimate potential underutilization or over-provisioning. A convenient measure is a ratio of the two times. In the example of FIG. 5, the first request has a first ratio 182 of 8/9. Here, software and the storage device 120 are contributing almost equally to latency on the host side. A second I/O request may take 12 microseconds for the virtualization layer and 3 microseconds for the storage device 120, or, a second ratio 184 of 4/1. The first ratio 182 higher ratio might suggest that the storage device is underutilized. The implications of the ratios may depend on the particularities of any given implementation. Any mathematical function of the two latency measures may be used. For instance, a linear combination, a difference between the two values, a relative difference, and so forth. The ratio method will be discussed below, with the understanding that other relativity computations can be used.

The middle section of FIG. 5 shows a graph 186 that illustrates how a ratio (or other measure of relative hardware/software latency) can be used to adjust the processing capacity of the relevant host virtualization layer components. As can be seen, the ratios of respective I/O transactions may change over time. A control loop monitors the current ratio. Preferably, to avoid rapidly fluctuating adjustments, the ratio is computed as an average over a running window (see FIG. 6). Any smoothing technique may be used. The control loop compares the current ratio to various thresholds 188 or ranges. When the ratio crosses a threshold, a corresponding adjustment is made to the relevant virtualization component. As shown in a second graph 190 in FIG. 5 (bottom section), over time, as the ratio changes, the processing capacity also changes as a function of the ratio and the thresholds. Other parameters may contribute to the processing capacity allocation function. For instance, a scaling factor may allow the function to take into account current system load or feedback from prior adjustments.

As discussed above, the point and method of adjusting processing capacity in the virtualization layer will vary. If there is an execution unit that performs the bulk of intermediating between the channel and the storage device, then that execution unit may be targeted. For example, if a pool of threads services the channel by parsing incoming requests, identifying their hardware target, and passing them to the correct device driver, then the number of threads in that pool can be increased and decreased according to the ratio and thresholds. If a process performs a similar function, the process might be given higher scheduling priority, additional processor time, etc. If the intermediating functionality can be isolated to a particular core, the core may be sped up or slowed down.

It should be appreciated that comparative latency methods described herein avoid the complexity of Quality of Service and prioritization approaches, which can be complex and sensitive to workloads. In fact, the methods are workload agnostic and can be universally applied. Furthermore, the methods do not require human adjustment. Appropriate selection of operating parameters and thresholds will sense when there is a hardware-software imbalance and automatically adjust. As conditions change, for instance as the rate of I/O requests increases or decreases, or as the storage device perhaps slows down (due to activity of another VM, for instance), the control loop detects the effects of those changes in the form of changes to the ratio. The monitoring, controlling, and adjusting may be duplicated for whatever corresponding virtualization elements scale. For instance, the number of channels may vary and each channel's servicing element may be a point of monitoring and tuning.

Figure 6:
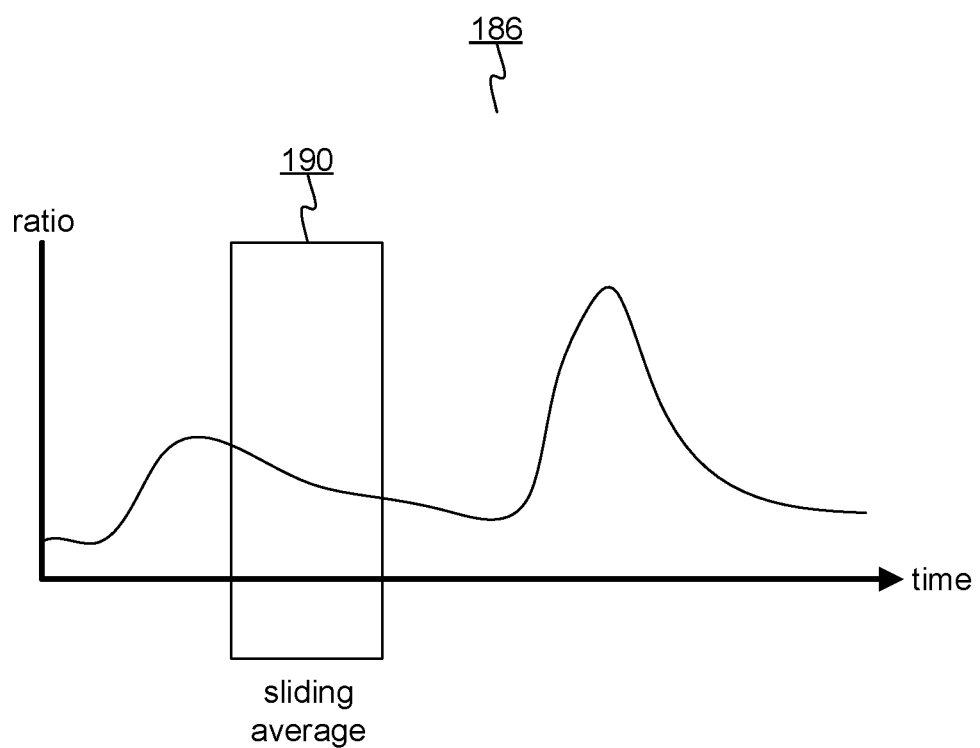
FIG. 6 shows a sliding statistical window.

FIG. 6 shows a sliding statistical window 190. The window 190 may be defined as a window of time (e.g., 10 seconds) and/or a window of I/O requests (e.g., the most recent 10,000 I/O requests). By using a statistical trend rather than individual ratios, smooth adjustments may be made to reflect overall system behavior. Spikes or anomalies in latency measures will have little effect.

Figure 7:
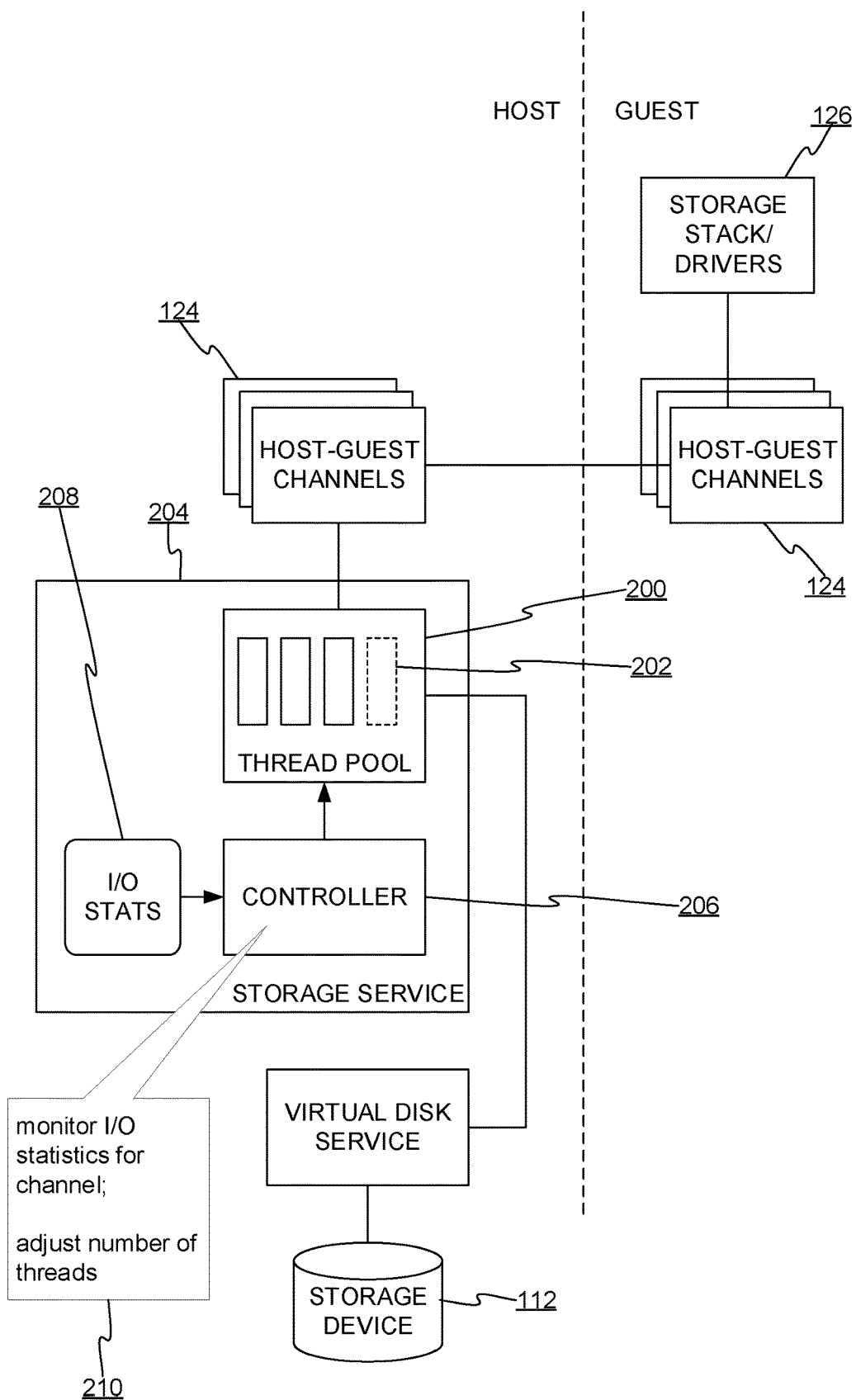
FIG. 7 shows an embodiment that adjusts the size of a thread pool that services a channel.

FIG. 7 shows an embodiment that adjusts the size of a thread pool that services a channel. As noted above, some virtualization layers use a pool 200 of threads 202 to service a VM-hypervisor communication channel. There may be storage or communication service 204 that manages the channels. In one embodiment, each channel has a respective controller 206 that collects I/O statistics 208 and performs a control loop 210 of evaluating the statistics, comparing the relative latency of the system to the thresholds, and adjusts the number of threads in the thread pool 200. If the system trends to a high volume of I/O requests and yet the storage device's latency does not proportionally increase, then new threads might be added to increase the capacity to shuttle I/O requests from the channel to the storage device. If a new thread stabilizes the running ratio compared to the thresholds then no threads are added or dispelled. If the storage device becomes heavily loaded and the host latency remains at a floor, the number of threads (or other form of processing capacity) is lowered.

Figure 8:
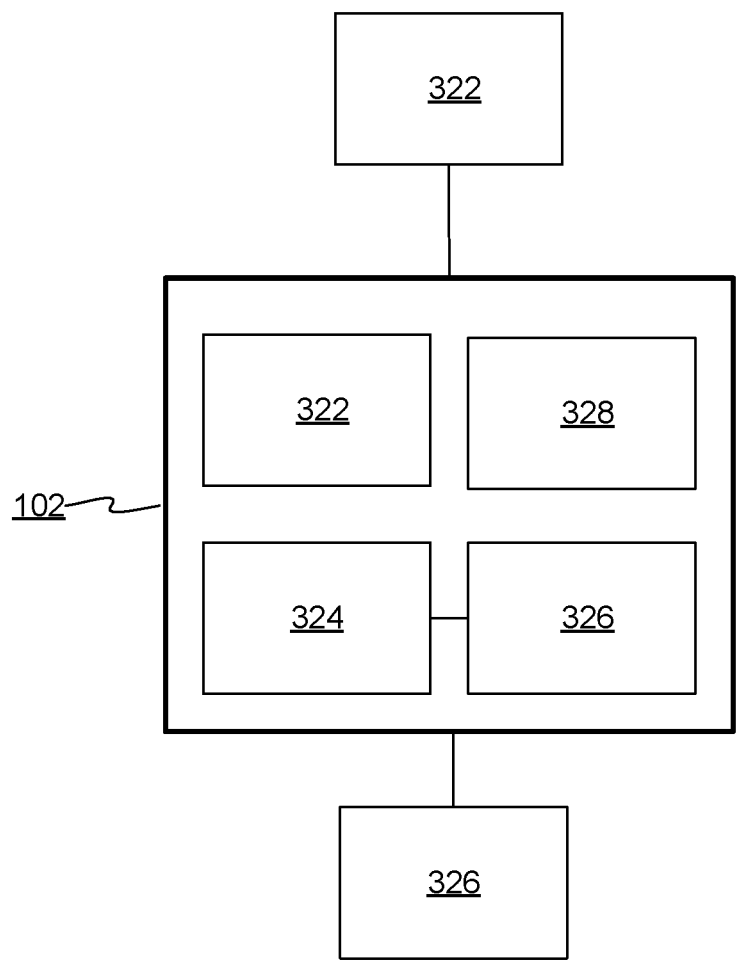
FIG. 8 shows details of the computing device on which embodiments described above may be implemented.

FIG. 8 shows details of the computing device 102 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 102 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc., and may or may not include the storage device 112. The meaning of the term "storage", as used herein does not refer to signals or energy per se, but rather refers to physical apparatuses and states of matter. The hardware elements of the computing device 102 may cooperate in ways well understood in the art of machine computing. In addition, input devices may be integrated with or in communication with the computing device 102. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware, memory hardware, and a physical device, the method comprising:
   executing the virtualization layer, the virtualization layer managing execution of VMs by the processing hardware, the virtualization layer including a storage virtualization stack, a virtual disk module, and a communication channel between the virtualization layer and a VM comprising a guest operating system, wherein the guest operating system issues input/output (I/O) requests associated with the physical device;
   receiving the I/O requests at the virtualization layer and adding the I/O requests to a queue for the physical device;
   servicing, by a pool of service threads in the virtualization layer, the I/O requests in the queue, the servicing comprising removing the I/O requests from the queue to provide the I/O requests to the physical device;
   obtaining first times for the physical device to perform the I/O requests, respectively, and computing a device time factor based on the first times;
   obtaining second times for the virtualization layer to service the I/O requests, respectively, and computing a servicing time factor based on the second times, wherein each first time includes time for removing the corresponding I/O request from the queue and does not include time for the physical device to perform the corresponding I/O request; and
   adjusting processing capacity of the servicing by the pool of service threads according to the device factor and the servicing factor, the adjusting comprising increasing or decreasing a number of threads in the pool of service threads.

2. A method according to claim 1, where the I/O request is associated with the physical device through a virtual device of the VM, the virtualization layer mapping the physical device to the virtual device.

3. A method according to claim 1, further computing a ratio of the servicing time factor and the device time factor, and determining, based on the ratio, whether a threshold has been reached.

4. A method according to claim 3, wherein the determining comprises comparing the ratio to the threshold.

5. A method according to claim 4, wherein the ratio is computed based on plural device time factors and plural servicing time factors, the device time factors and the servicing time factors comprising respective time values in a sliding sample window.

6. A method according to claim 1, wherein the device time factor corresponds to a first amount of time taken by the physical device to implement the I/O requests, and wherein the servicing time factor corresponds to a second amount of time taken by the virtualization layer to service the I/O requests.

7. A method according to claim 6, wherein the device time factor and/or the servicing time factor are derived from kernel statistics of a hypervisor of the virtualization layer.

8. A computing device comprising:
   processing hardware;
   a hardware device;
   storage hardware storing: a hypervisor configured to manage execution of virtual machines (VMs), wherein the hypervisor manages sharing of the processing hardware and the hardware device by the VMs, the hypervisor configured to perform a process comprising:
      receiving, by the hypervisor, requests from a VM, the requests directed to the hardware device, the requests received from a hypervisor-VM communication channel managed by the hypervisor, the receiving comprising adding the requests to a queue managed by the hypervisor for the hardware device;
      servicing the requests by a thread pool of the hypervisor removing the requests from the queue and providing the dequeued requests to the hardware device, which performs the requests;
      determining first times for the thread pool to provide the requests to the hardware device, respectively;
      determining second times for the hardware device to perform the requests, wherein each second time does not include time for the hypervisor to provide the corresponding request to the hardware device, and wherein each first time does not include time for the hardware device to perform the corresponding request; and
      based on the first times and the second times, automatically scaling a number of threads in the thread pool.

9. A computing device according to claim 8, wherein the hardware device comprises a storage device, the requests comprise I/O requests directed to virtual disk data that is backed by the storage device, and the hypervisor comprises a virtual disk service that maps the virtual disk data to the storage device.

10. A computing device according to claim 8, wherein the process further comprises computing a measure based on the first and second times, wherein the measure varies in correspondence with variation of the first times relative to the second times.

11. A computing device according to claim 10, wherein the measure is compared to a threshold to determine whether or how much processing capacity is to be added or removed.

12. A computing device according to claim 8, wherein the hypervisor comprises a kernel that samples I/O performance data, and the first and second times are obtained from the performance data.

13. A computing device according to claim 8, wherein the number of threads changes in correspondence with latency of the hardware device performing the requests relative to latency of the hypervisor providing the requests to and/or from the hardware device.

14. Storage hardware storing information configured to cause a computer to perform a process, the computer comprising a hardware device, the process comprising:
  providing a virtualization layer that manages execution of virtual machines (VMs) by the computer, the virtualization layer including a channel service that manages channels between the VMs and the virtualization layer, the channels configured to carry data between guest software in the VMs and the virtualization layer;
  managing, by the virtualization layer, the channel service that provides the channels, the channel service configured to provide a channel that enables guest software in the VM to exchange, through the virtualization layer, data with the hardware device, the channel comprising a queue in the virtualization layer, the providing the channel including allocating a thread pool to the channel, the channel comprising a queue, the thread pool configured to dequeue requests from the guest software in the VM and provide the dequeued requests to the hardware device; and
  executing a control loop in association with the channel, the control loop comprising monitoring latency statistics of the hardware device and latency statistics of the thread pool and repeatedly determining, based on the monitoring of the latency statistics of the hardware device and the latency statistic of the thread pool, whether a number of threads int he thread pool is to be increased or decreased, wherein the latency statistics of the hardware device represent latency of the hardware device and not latency of the thread pool.

15. Storage hardware according to claim 14, the process further comprising receiving responses to the requests from the hardware device, wherein the processing unit enqueues the responses to the channel to be received by the VM.

16. Storage hardware according to claim 15, wherein the latency statistics reflect time spent by the thread pool to perform the enqueueing.

17. Storage hardware according to claim 14, wherein the virtualization layer comprises a storage virtualization stack, and wherein the latency statistics include time spent by the virtualization stack to service the requests.

18. Storage hardware according to claim 17, the process further comprising computing an average latency of the hardware device, an average latency of the storage virtualization stack, and wherein the determining of the control loop comprises determining whether a ratio of the latency averages satisfies a threshold.

19. Storage hardware according to claim 17, wherein the virtualization layer comprises a privileged VM that provides virtualization services to the VM.

\* \* \* \* \*